US010465718B2

(12) United States Patent
Arikawa et al.

(10) Patent No.: US 10,465,718 B2
(45) Date of Patent: Nov. 5, 2019

(54) ACCUMULATOR

(71) Applicant: EAGLE INDUSTRY CO., LTD., Tokyo (JP)

(72) Inventors: Tatsuhiro Arikawa, Tokyo (JP); Matsuyoshi Yamashita, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 81 days.

(21) Appl. No.: 15/570,937

(22) PCT Filed: Jun. 16, 2016

(86) PCT No.: PCT/JP2016/067874
§ 371 (c)(1),
(2) Date: Oct. 31, 2017

(87) PCT Pub. No.: WO2016/208478
PCT Pub. Date: Dec. 29, 2016

(65) Prior Publication Data
US 2018/0128288 A1 May 10, 2018

(30) Foreign Application Priority Data
Jun. 22, 2015 (JP) ................................ 2015-124405

(51) Int. Cl.
*F16L 55/04* (2006.01)
*F15B 1/10* (2006.01)
*F15B 20/00* (2006.01)

(52) U.S. Cl.
CPC .............. *F15B 1/106* (2013.01); *F15B 1/103* (2013.01); *F15B 20/007* (2013.01); *F15B 2201/3153* (2013.01); *F15B 2201/41* (2013.01)

(58) Field of Classification Search
CPC ........ F15B 1/106; F15B 1/103; F15B 20/007; F15B 2201/3153; F15B 2201/41; F16L 55/04
(Continued)

(56) References Cited

U.S. PATENT DOCUMENTS 7,770,599 B2 * 8/2010 Ota ........................ F15B 1/103 138/26
7,810,522 B1 10/2010 Nakaoka et al.
(Continued)

FOREIGN PATENT DOCUMENTS

CN 1583482 A 2/2005
CN 101809294 A 8/2010
(Continued)

OTHER PUBLICATIONS

First Office Action for China Patent Application No. 201680025179.3 dated Sep. 30, 2018 (7 pages) and partial translation (2 pages).
(Continued)

*Primary Examiner* — James F Hook
(74) *Attorney, Agent, or Firm* — Harness, Dickey & Pierce, P.L.C.

(57) ABSTRACT

An accumulator has a pressure vessel, a partition portion comparting an internal space of the pressure vessel into a gas chamber having sealed gaseous matter and a liquid chamber having introduced liquid, and a bellows connected to the partition portion. The partition portion is provided with a bellows connection portion connected to the bellows, a seal arranged in a liquid chamber side of the bellows connection portion, and a seal retention portion fixed to the bellows connection portion and retains the seal. The seal retention portion is constructed by a leaf spring which is elastically deformable in a part thereof, and is structured by integrally forming a fixed portion fixed to the bellows connection
(Continued)

portion, and a retention portion retaining the seal. Accordingly, the accumulator can reduce the number of parts of a pressure fluctuation absorbing mechanism, can be easily assembled, and can reduce a parts cost.

7 Claims, 15 Drawing Sheets

(58) Field of Classification Search
USPC ........................................................ 138/30, 31
See application file for complete search history.

(56) References Cited

U.S. PATENT DOCUMENTS

| | | | | |
|---|---|---|---|---|
| 8,096,324 | B2 * | 1/2012 | Nakaoka | F15B 1/103 138/30 |
| 8,371,336 | B2 * | 2/2013 | Nakaoka | F15B 1/103 138/30 |
| 2005/0061379 | A1 | 3/2005 | Mori et al. | |
| 2006/0037658 | A1 * | 2/2006 | Shimbori | F15B 1/106 138/30 |
| 2010/0108168 | A1 | 5/2010 | Ota et al. | |
| 2010/0193059 | A1 | 8/2010 | Nakaoka et al. | |
| 2012/0006438 | A1 | 1/2012 | Nakaoka et al. | |
| 2014/0224368 | A1 * | 8/2014 | Yamashita | F15B 1/103 138/31 |
| 2014/0311604 | A1 | 10/2014 | Yoshihara | |
| 2015/0204357 | A1 | 7/2015 | Hyodo et al. | |
| 2017/0009782 | A1 * | 1/2017 | Arikawa | F15B 1/103 |

FOREIGN PATENT DOCUMENTS

| | | | |
|---|---|---|---|
| CN | 101821514 | A | 9/2010 |
| CN | 202646190 | U | 1/2013 |
| CN | 202971358 | U | 6/2013 |
| CN | 103998792 | A | 8/2014 |
| CN | 104583606 | A | 4/2015 |
| DE | 10304999 | A1 | 8/2004 |
| EP | 2196681 | A1 | 6/2010 |
| JP | 2009-092144 | A | 4/2009 |
| JP | 2010-112431 | A | 5/2010 |
| JP | 2010121637 | A | 6/2010 |
| WO | WO-2009-047964 | A1 | 4/2009 |

OTHER PUBLICATIONS

Extended European Search Report for Patent Application No. EP 16814249.5, dated May 4, 2018 (9 paqes).

* cited by examiner

ACCUMULATOR

CROSS-REFERENCE TO RELATED APPLICATIONS

This application is a U.S. National Stage Application of International Application No. PCT/JP2016/067874, filed on Jun. 16, 2016, and published in Japanese as WO 2016/208478 A1 on Dec. 29, 2016 and claims priority to Japanese Application No. 2015-124405, filed on Jun. 22, 2015. The entire disclosures of the above applications are incorporated herein by reference.

BACKGROUND OF THE INVENTION

Field of the Invention

The present invention relates to an accumulator, and more particularly to an accumulator which is used in a hydraulic piping of a vehicle such as a motor vehicle.

Description of the Conventional Art

As shown in FIG. 15, there has been conventionally known an accumulator 101 having a pressure vessel 102 with an oil port 104 which is communicated with a pressure piping (not shown), a partition portion 111 which comparts an internal space of the pressure vessel 102 into a gas chamber 109 including gaseous matter in a sealed manner and a liquid chamber 110 introducing liquid, a bellows 107 which is installed between the oil port 104 and the partition portion 111, and a stay 108 which is fixed to an inner side of the oil port 104. Further, the partition portion 111 is provided with a bellows connection portion 112 to which the bellows 107 is connected, a seal 115 which is arranged in the liquid chamber 110 side of the bellows connection portion 112, and a seal retention portion 114 which is fixed to the bellows connection portion 112 and retains the seal 115. Further, the seal retention portion 114 is provided with a pressure fluctuation absorbing mechanism having a spring 119 which is installed between the seal 115 and the seal retention portion 114, and elastically presses the seal 115 toward the bellows connection portion 112, and absorbing fluctuation of pressure in the liquid chamber 110 (hereinafter, refer to as "liquid pressure"). A clearance **108*d* for preventing the spring 119 extending in an axial direction and the seal retention portion 114 from coming into contact with the stay 108 is formed in the stay 108**.

In the accumulator 101, when the pressure of the pressure piping comes down extremely to zero or to be just about zero due to an operation stop of the device (hereinafter, refer to as "zero-down"), the liquid pressure thereof is below the pressure of the gas chamber 109 (hereinafter, refer to as "gas pressure"). As a result, the bellows connection portion 112 moves to the liquid chamber 110 side and the seal 115 seats on the stay 108, so that the seal 115 closes a gas chamber side liquid outlet and inlet **108*e* when seating. Therefore, a liquid chamber side liquid outlet and inlet 104*b* is closed by the seal 115 and prevents further pressure drop of the liquid chamber 110**.

Further, the liquid confined in the liquid chamber 110 at the zero-down time may be expanded by rise in atmospheric temperature. At this time, the pressure acts to a whole area in the gas chamber 109 side of the seal 115, however, the pressure acts only on a surface where the seal 115 does not seat on the stay 108 in the liquid chamber 110 side of the seal 115. As a result, pressure difference is generated between the liquid chamber 110 side of the seal 115 and the gas chamber 109 side of the seal 115. On the other hand, the pressure difference in the seal 115 is not generated in the liquid pressure and the gas pressure which is applied to the bellows connection portion 112.

As a result, in the accumulator when the liquid confined in the liquid chamber 110 thermally expands at the zero-down time, only the bellows connection portion 112 moves toward a position where the liquid pressure and the gas pressure balance while the seal 115 keeps seating on the stay 108, as shown in FIG. 16.

Therefore, even in the case that the liquid confined in the liquid chamber 110 at the zero-down time is expanded due to the rise of the atmospheric temperature and the difference is generated between the liquid pressure and the gas pressure, the pressure fluctuation absorbing mechanism formed in the accumulator 101 absorbs the pressure difference and the pressure difference can be accordingly reduced.

However, the following problems occur even in the above structure.

More specifically, since the spring 119 is necessarily provided in the pressure fluctuation absorbing mechanism having the structure mentioned above, the number of parts of the pressure fluctuation absorbing mechanism is increased, the structure of the pressure fluctuation absorbing mechanism is complicated, and it is not easy to assemble the pressure fluctuation absorbing mechanism.

Further, since it is necessary to set the clearance **108*d* for preventing the spring 119 extending in the axial direction and the seal retention portion 114 from coming into contact with the stay 108 when the seal 115 is pressed to the stay 108, the structure of the stay 108** is complicated, and a parts cost is increased.

The present invention is made by taking the above points into consideration, and a technical object of the present invention is to provide an accumulator which can reduce the number of parts of a pressure fluctuation absorbing mechanism, can be easily assembled, and can reduce a parts cost.

SUMMARY OF THE INVENTION

As a means for effectively solving the technical problem mentioned above, an accumulator described in a first aspect of the present invention is an accumulator comprising a pressure vessel, a partition portion which comparts an internal space of the pressure vessel into a gas chamber in which gaseous matter is sealed and a liquid chamber to which liquid is introduced, and a bellows which is connected to the partition portion, wherein the partition portion is provided with a bellows connection portion which is connected to the bellows, a seal which is arranged in a liquid chamber side of the bellows connection portion, and a seal retention portion which is fixed to the bellows connection portion and retains the seal, and the seal retention portion is constructed by a leaf spring which is elastically deformable in a part thereof, and is structured by integrally forming a fixed portion which is fixed to the bellows connection portion, and a retention portion which retains the seal.

Further, the invention described in a second aspect is the accumulator described in the first aspect, wherein the fixed portion is formed into an annular shape, and the retention portion is constructed by an elastically deformable leaf spring, is formed into a projection shape which protrudes toward a direction of an inner diameter from the fixed portion, and is provided so as to be circumferentially divided into a plurality of sections.

Further, the invention described in a third aspect is the accumulator described in the second aspect, wherein a leading end portion protruding toward one side in a circumferential direction is integrally provided in an end portion in the direction of the inner diameter of the retention portion.

Further, the invention described in a fourth aspect is the accumulator described in the first aspect, wherein the seal retention portion is constructed by an elastically deformable leaf spring, and is provided with a plurality of fixed portions which are formed radially from a center of the seal retention portion, and are fixed to the bellows connection portion, and retention portions which are formed between the fixed portion and the adjacent fixed portion and retain the seal.

Further, the invention described in a fifth aspect is the accumulator described in the first aspect, wherein the seal retention portion is constructed by a plurality of fixed portions which extend toward a direction of an outer diameter from a center of the seal retention portion and are fixed to the bellows connection portion, and a retention portion which is constructed by an elastically deformable leaf spring, is formed toward one side in a circumferential direction from a midstream in a length direction of a radial direction of the fixed portions and retains the seal.

Further, the invention described in a sixth aspect is the accumulator described in any one of the first aspect to the fifth aspect, wherein a fixing groove is formed in an inner peripheral surface of the bellows connection portion, and the seal retention portion is fixed to the bellows connection portion by being locked to the fixing groove.

Effect of the Invention

According to the accumulator of the present invention, the seal retention portion plays both of a role of retaining the seal and a role of reducing and absorbing the pressure difference between the liquid pressure and the gas pressure. As a result, the number of parts of the pressure fluctuation absorbing mechanism can be reduced, the assembly thereof can be easily carried out, and a parts cost thereof is reduced.

BRIEF EXPLANATION OF THE DRAWINGS

FIGS. 5A to 5C show a seal retention portion of an accumulator according to a second embodiment of the present invention, in which FIG. 5A is a plan view, FIG. 5B is a cross sectional view along a line A-A in FIG. 5A and FIG. 5C is a cross sectional view along a line B-B in FIG. 5A;

FIGS. 14A to 14C are enlarged cross sectional views of a substantial part the an accumulator according to the present invention, in which FIG. 14A is the enlarged cross sectional view of the substantial part of the partition portion in the accumulators according the third and fourth embodiments, FIG. 14B is the enlarged cross sectional view of the substantial part of a partition portion in an accumulator according to a fifth embodiment, and FIG. 14C is the enlarged cross sectional view of the substantial part of a fixing groove in FIG. 14B;

DETAILED DESCRIPTION OF PREFERRED EMBODIMENTS

Figure 1:
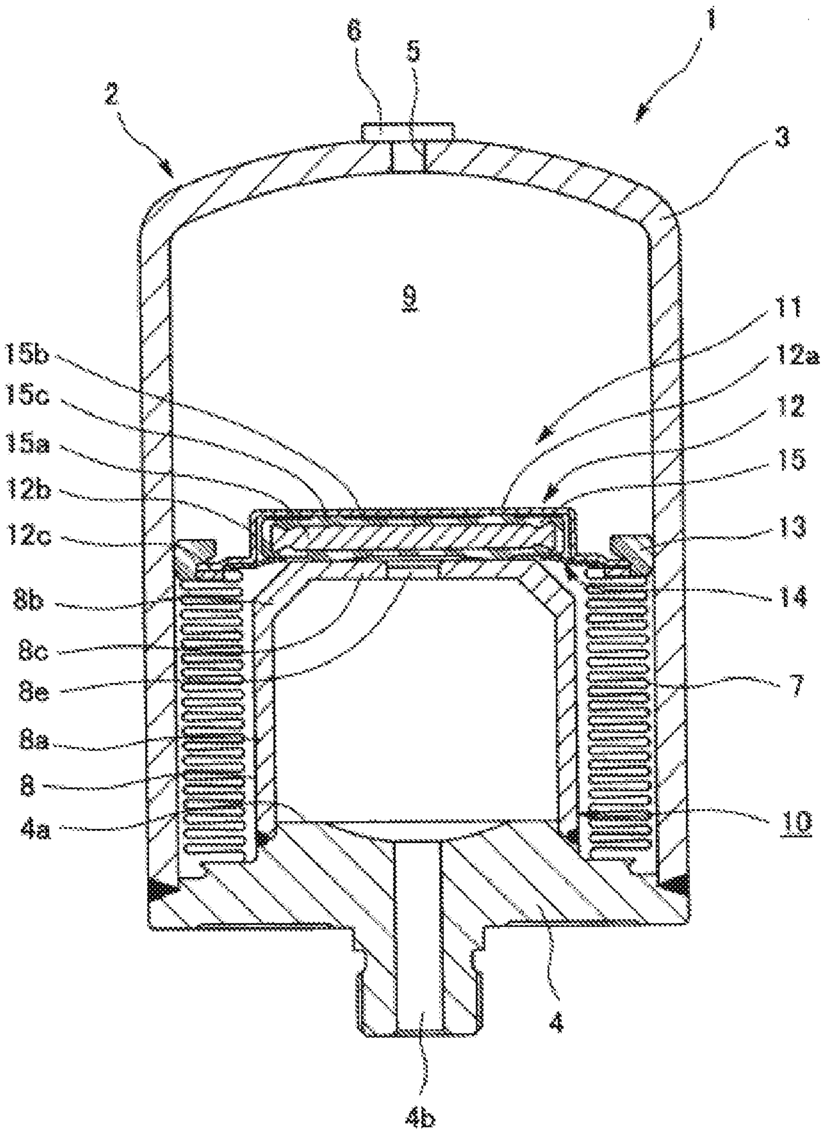
FIG. 1 is a cross sectional view of an accumulator according to a first embodiment of the present invention.
Figure 2:
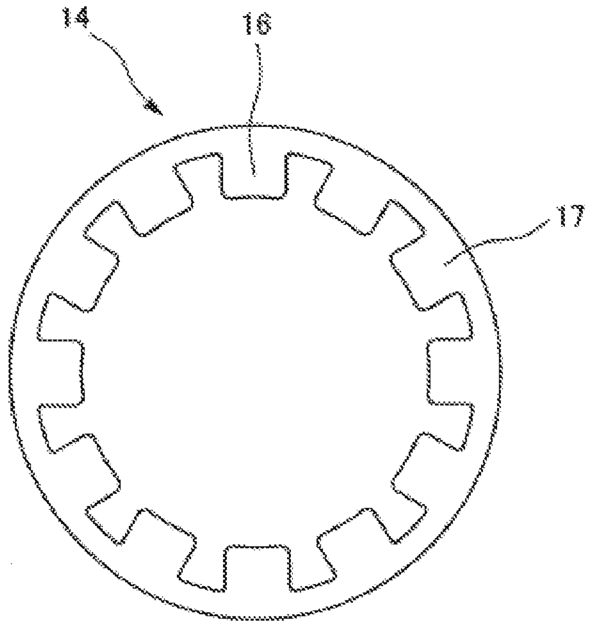
FIG. 2 is a plan view of a seal retention portion of the accumulator according to the first embodiment of the present invention.

A description will be in detail given below of an accumulator 1 according to a first embodiment of the present invention with reference to the accompanying drawings. FIG. 1 is a cross sectional view of the accumulator 1 according to the first embodiment of the present invention, and FIG. 2 is a plan view of a seal retention portion 14 of the accumulator 1 according to the first embodiment of the present invention.

The accumulator 1 is provided with an oil port 4 which is communicated with a pressure piping (not shown), and a pressure vessel 2 which is constructed by a shell 3 having a U-shaped cross section. The pressure piping is structured such as to be connected to the oil port 4 and be communicated with a liquid chamber side liquid outlet and inlet 4*b* which is provided in the oil port 4, and liquid is appropriately introduced to an internal space of the pressure vessel 2 from the pressure piping. Further, the shell 3 is provided with a gas inlet port 5 for injecting gaseous matter, and seals the gaseous matter by being fitted a gas chamber plug 6 after the gaseous matter injection. Here, the pressure vessel 2 is shown as a combination with the oil port 4 which is fixed to an opening portion of the shell 3, however, may be structured, for example, such that the pressure vessel 2 is integrated with the shell 3 and the oil port 4, or is provided with an end cover as a separate body in a bottom portion of the shell 3. A parts distribution structure of the shell 3 and the oil port 4 is not particularly limited.

Further, the internal space of the pressure vessel 2 is provided with a stay 8 which is arranged in an inner periphery of the oil port 4, a partition portion 11 which comparts into a gas chamber 9 sealing gaseous matter and a liquid chamber 10 introducing liquid, and a bellows 7 which is connected to the partition portion 11 and is arranged in an outer peripheral side of the stay 8. Here, gas can be listed up, for example, as the gaseous matter which is sealed in the gas chamber 9, and nitrogen gas is particularly preferable. Further, oil can be listed up, for example, as the liquid which is introduced into the liquid chamber 10.

In the stay 8, an end face portion 8*c* is formed in one end of a cylindrical portion 8*a* in the gas chamber 9 side so as to be directed to a direction of an inner diameter via a taper surface 8*b*. Further, the stay 8 is provided in the other end of the cylindrical portion 8*a* in the liquid chamber 10 side with an oil port fixed surface 4*a* which is fixed to an inner periphery of the oil port 4. A gas chamber side liquid outlet and inlet 8*e* is formed at the center of the end face portion 8*c*, and a liquid chamber side liquid outlet and inlet 4*b* is formed at the center of the oil port fixed surface 4*a*.

The bellows 7 is connected to the partition portion 11, is fixed its one end to an inner surface of the oil port 4, and is fixed its other end to a bellows fixing surface 12*c* in the partition portion 11. As a result, the bellows 7 can be expanded and contracted in an axial direction (a vertical direction in FIG. 1).

Here, the partition portion 11 is provided with a bellows connection portion 12 which is connected to the bellows 7, a seal 15 which is arranged in the liquid chamber 10 side of the bellows connection portion 12, and a seal retention portion 14 which is fixed to the bellows connection portion 12 and retains the seal 15 by elastically energizing in a pressing direction toward the bellows connection portion 12.

The bellows connection portion 12 is formed into an approximately concave shape in a cross section, and is constructed by a seal contact surface 12*a* which comes into contact with a seal 15 and a spacer 15*c* provided in the seal 15 in the liquid chamber 10 side, a flange surface 12*b* which is formed from both ends of the seal contact surface 12*a* to the liquid chamber 10 side, and a bellows fixing surface 12*c* which extends in a direction of an outer diameter from one end of the flange surface 12*b* in the liquid chamber 10 side. Here, an inner periphery of the flange surface 12*b* is a large diameter in relation to an outer periphery of the seal 15. Further, a guide 13 is interposed between an outer peripheral end of the bellows fixing surface 12*c* and an inner side of the shell 3, the guide 13 preventing the contact among the inner side of the pressure vessel 2, the bellows connection portion 12 and the bellows 7.

The seal 15 is provided with a discoid rigid plate 15*a* which is made of a material having a high rigidity such as metal or hard resin. Further, a coating portion 15*b* made of a rubber-like elastic body is attached (vulcanization bonded) to a surface of the rigid plate 15*a*. Since the coating portion 15*b* in the seal 15 seats on the end face portion 8*c* so as to freely come close to and away from the end face portion 8*c*, the coating portion 15*b* closes the gas chamber side liquid outlet and inlet 8*e* in the gas chamber side at the time of seating and closes the liquid chamber 10. In addition, a spacer 15*c* is provided in the seal 15.

The spacer 15*c* is provided in the gas chamber 9 side of the seal 15. At the time of zero-down, the seal 15 and the bellows connection portion 12 are in a contact state, and the liquid is hard to make an intrusion into a space between the seal 15 and the bellows connection portion 12 when the liquid is expanded. As a result, the expanded liquid tends to make an intrusion into a portion between the seal 15 and the bellows connection portion 12 by the provision of the spacer 15*c* in the seal 15.

The seal retention portion 14 is arranged just below the seal 15 in the liquid chamber 10 side, as shown in FIGS. 1 and 2, and is constructed by a fixed portion 17 which is fixed (welded) to the liquid chamber 10 side of the bellows fixing surface 12*c*, and a retention portion 16 which protrudes out of the fixed portion toward a direction of an inner diameter and is provided so as to be circumferentially divided into a plurality of sections.

The retention portion 16 is constructed by an elastically deformable leaf spring, and bends so as to be driven by a motion of the bellows connection portion 12 toward an expanding and contracting direction of the bellows 7 by elastically energizing the seal 15 in a pressing direction toward the bellows connection portion 12. Further, a clearance gap in which the liquid flows is provided between the retention portion 16 and the adjacent retention portion 16 thereto.

Figure 3:
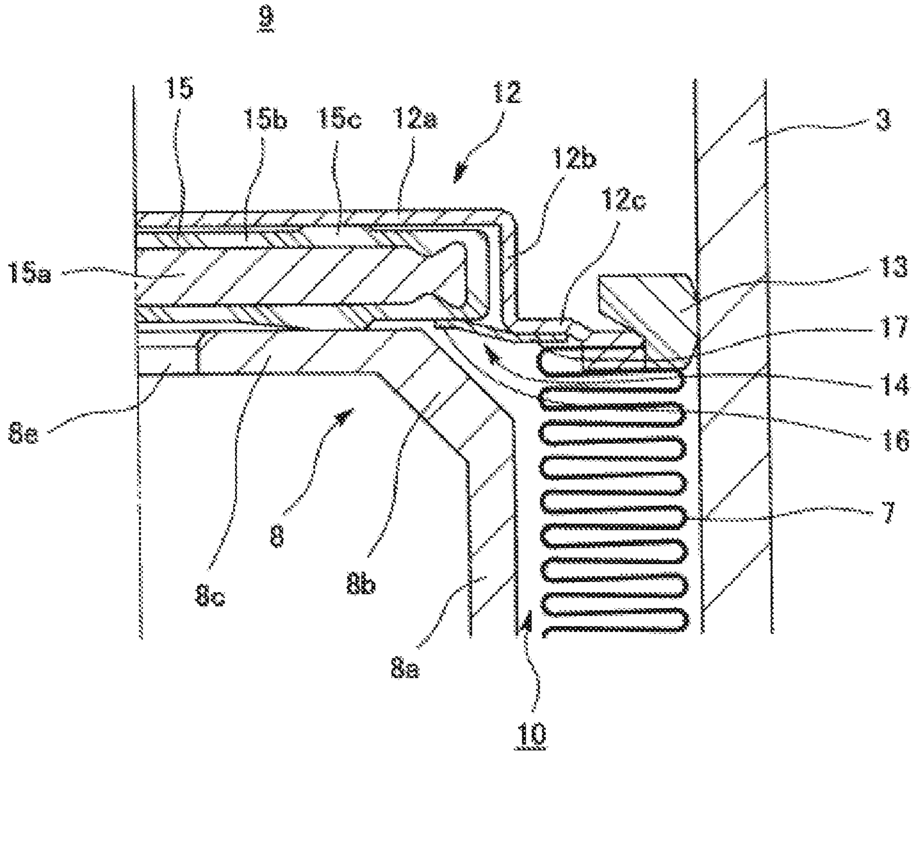
FIG. 3 is an enlarged cross sectional view of a substantial part and shows a state in which the accumulator according to the first embodiment of the present invention is at the time of zero-down.
Figure 4:
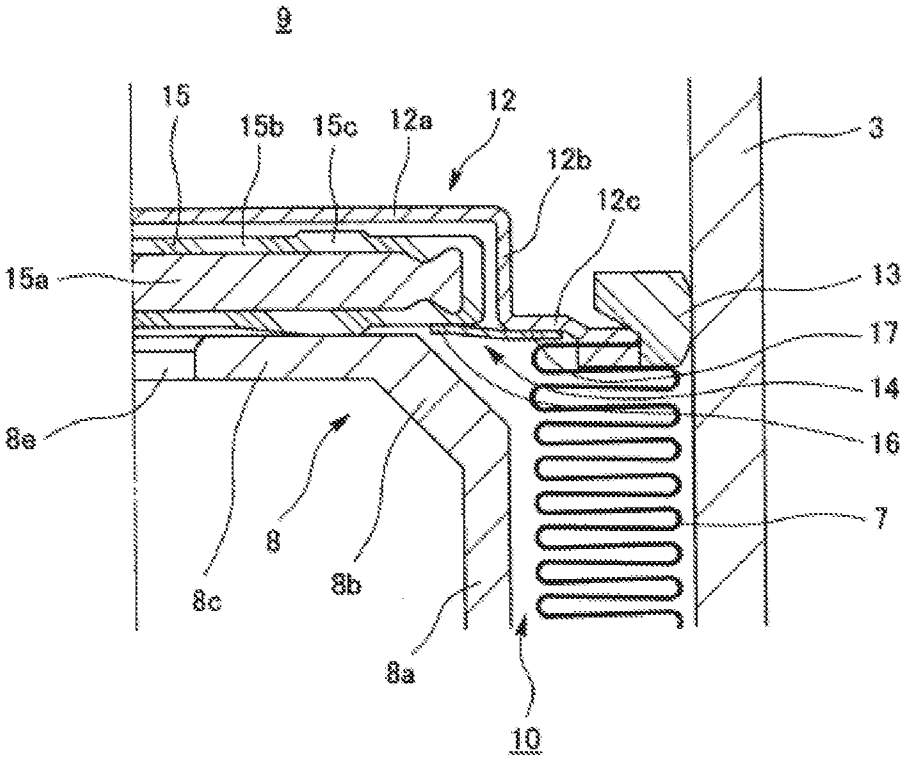
FIG. 4 is an enlarged cross sectional view of a substantial part and shows a state in which the accumulator according to the first embodiment of the present invention is at the time of operation.

Next, a description will be given of an operation of the accumulator 1. FIG. 3 is an enlarged cross sectional view of a substantial part and shows a state in which the accumulator 1 according to the first embodiment of the present invention is at the time of zero-down, and FIG. 4 is an enlarged cross sectional view of the substantial part and shows a state in which the accumulator 1 according to the first embodiment of the present invention is at the time of operation.

At the Time of Steady

The accumulator 1 is connected to a pressure piping of the device in the oil port 4. In the steady time of the pressure piping of the device, the seal 15 moves together with the bellows connection portion 12 while being retained by the seal retention portion 14, and is away from the end face portion 8*c* of the stay 8. As a result, the gas chamber side liquid outlet and inlet 8*e* provided in the end face portion 8*c* is in an open state. Therefore, the gas chamber side liquid outlet and inlet 8*e* is communicated with the liquid chamber side liquid outlet and inlet 4*b* provided in the oil port 4 side, and the liquid having the pressure in correspondence to occasions flows into the liquid chamber 10 from the liquid chamber side liquid outlet and inlet 4*b*. As a result, the bellows connection portion 12 can move as occasion demands together with the seal retention portion 14 and the seal 15 so that the liquid pressure and the gas pressure balance.

At the Time of Zero-Down

In the case that the zero-down state comes from the state of the steady time mentioned above, the liquid within the liquid chamber 10 is discharged out of the liquid chamber side liquid outlet and inlet 4*b* in the oil port 4. Accordingly, the liquid pressure is below the gas pressure. In conjunction with this, the bellows connection portion 12 moves in the contracting direction of the bellows 7. Thereafter, the seal 15 arranged in the liquid chamber 10 side of the bellows connection portion 12 seats on the end face portion 8*c* of the stay 8, and closes the gas chamber side liquid outlet and inlet 8*e*. As a result, since a part of the liquid is confined in the liquid chamber 10, the further pressure drop of the liquid chamber 10 is prevented, and the liquid pressure and the gas pressure of the liquid chamber 10 and the gas chamber 9 balance inside and outside the bellows connection portion 12.

When Liquid within Liquid Chamber 10 is Expanded at the Time of Zero-Down

In a state in which the seal 15 seats on the end face portion 8*c* of the stay 8 and the liquid chamber 10 is closed at the time of zero-down mentioned above, the liquid confined in the liquid chamber 10 and the gaseous matter confined in the gas chamber 9 may be expanded by the rise of the atmospheric temperature. In this case, a pressure difference is generated between the liquid pressure and the gas pressure on the basis of the expansion of the liquid which is great in coefficient of expansion in comparison with the gaseous matter. Since an inner periphery of the flange surface 12*b* has a large diameter in relation to an outer periphery of the seal 15, a clearance gap in which the liquid flows is provided between the inner periphery of the flange surface 12*b* and the seal 15, and a clearance gap in which the liquid flows is provided in the seal retention portion 14 between the retention portion 16 and the retention portion 16 which are adjacent to each other in a concentric direction. Therefore, the liquid passes between the inner periphery of the flange surface 12*b* and the seal 15 via the clearance gap which is provided in the seal retention portion 14 and reaches the space which is provided by the spacer 15*c*, on the basis of the rising liquid pressure. As a result, the bellows connection portion 12 moves to a position where the liquid pressure and the gas pressure balance toward the extending direction of the bellows 7 on the basis of the pressure difference, as shown in FIG. 4. Further, the fixed portion 17 of the seal retention portion 14 fixed to the bellows connection portion 12 is driven by the motion of the bellows 7 toward the extending direction, and the retention portion 16 retaining the seal 15 is elastically deformed in the contracting direction of the bellows 7. Therefore, when the liquid confined in the liquid chamber 10 is thermally expanded at the time of zero-down, only the bellows connection portion 12 moves toward a position where the liquid pressure and the gas pressure balance while the seal 15 keeps seating on the end face portion 8*c*.

Since the liquid pressure acts on the gas chamber 9 side of the seal 15 in its whole area, and the liquid pressure acts only on the surface in which the seal 15 does not seat on the stay 8 in the liquid chamber 10 side of the seal 15, the pressure difference is generated between the liquid chamber 10 side and the gas chamber 9 side. On the other hand, the pressure difference like the seal 15 is not generated in the liquid pressure and the gas pressure which are applied to the bellows connection portion 12. Therefore, the seal 15 does not move in the extending direction of the bellows 7.

When Zero-Down is Dissolved

In the case that the zero-down state is dissolved and the liquid flows into from the liquid chamber side liquid outlet and inlet 4*b* of the oil port 4, the liquid pressure acts on the seal 15, and the seal 15 is separated from the end face portion 8*c* of the stay 8. As a result, the partition portion 11 moves to a position where the liquid pressure and the gas pressure balance toward the extending direction of the bellows 7, and returns to the steady time mentioned above.

According to the accumulator 1 having the structure mentioned above, in the case that the liquid confined in the liquid chamber 10 is thermally expanded at the time of zero-down, only the bellows connection portion 12 moves toward the position where the liquid pressure and the gas pressure balance, while the seal 15 keeps seating on the end face portion 8*c*. Therefore, the seal retention portion 14 absorbs and reduces the pressure difference, and maintains the balancing state of the liquid pressure and the gas pressure, thereby preventing the bellows 7 from being broken in the accumulator 1. As a result, it is possible to improve the durability of the accumulator 1 including the bellows 7.

Further, the seal retention portion 14 plays both of a role of retaining the seal 15 and a role of allowing a relative displacement of the seal 15 and the bellows connection portion 12. Accordingly, it is possible to reduce the number of parts of the pressure fluctuation absorbing mechanism in the prior art, it is possible to easily assemble, and it is possible to reduce a parts cost.

Further, since the seal retention portion 14 is provided in the bellows connection portion 12, the seal retention portion 14 does not interfere with the stay 8. As a result, the end face portion 8*c* can be integrally formed toward the direction of the inner diameter directly from one end of the cylindrical portion 8*a* in the gas chamber 9 side without any special shape applied to the stay 8. Therefore, it is possible to reduce a parts cost of the stay 8.

Figure 5A:
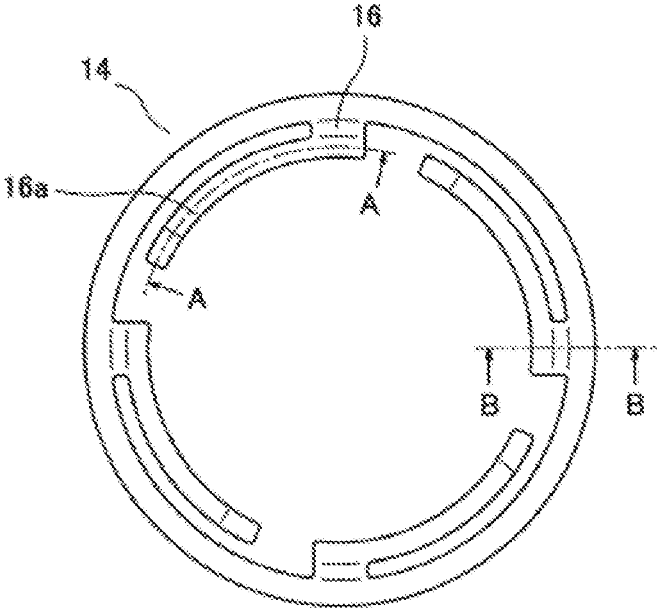
Figure 5B:
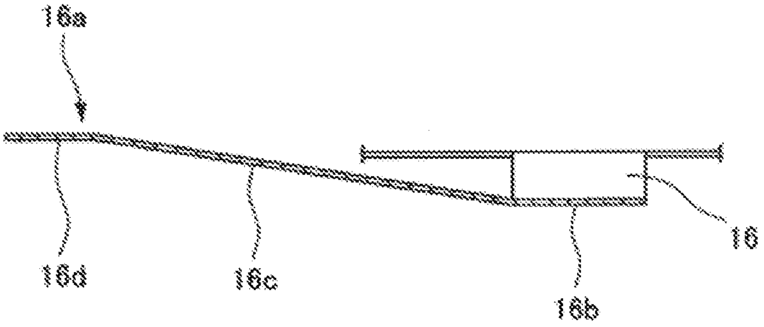
Figure 5C:
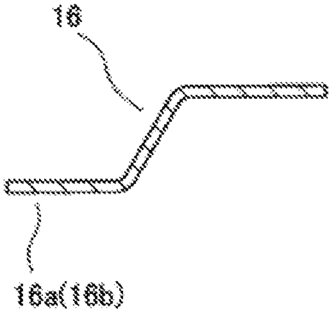

Next, a description will be given of an accumulator 1 according to a second embodiment of the present invention with reference to FIGS. 5A, 5B and 5C. FIGS. 5A, 5B and 5C show a seal retention portion 14 of the accumulator 1 according to the second embodiment of the present invention, in which FIG. 5A is a plan view, FIG. 5B is a cross sectional view along a line A-A in FIG. 5A, and FIG. 5C is a cross sectional view along a line B-B in FIG. 5A.

More specifically, the present embodiment is different in a point that a leading end portion 16*a* protruding toward one side in a circumferential direction is integrally provided in the retention portion 16 in an inner periphery of the seal retention portion 14 according to the present embodiment, in addition to the structure of the accumulator 1 according to the first embodiment.

Here, the leading end portion 16*a* is inclined toward the gas chamber 9 side from an end portion in a direction of an inner diameter of the retention portion 16. Further, the leading end portion 16*a* is structured such that a base end surface 16*b*, an inclined surface 16*c* and the other end surface 16*d* are integrally formed in this order, and protrudes out toward one side in a circumferential direction in relation to the seal retention portion 14. The base end surface 16*b* is provided in the end portion in the direction of the inner diameter of the retention portion 16, the inclined surface 16*c* is inclined toward the other end surface 16*d* from the base end surface 16*b*, and the other end surface 16*d* elastically energizes the seal 15 in a pressing direction toward the bellows connection portion 12.

As a result, the seal retention portion 14 in the accumulator 1 mentioned above is elongated in the peripheral direction as a whole of the seal retention portion 14 by the provision of the leading end portion 16*a* in addition to the retention portion 16. Therefore, the bending amount can be set more than the seal retention portion 14 according to the first embodiment.

Figure 6:
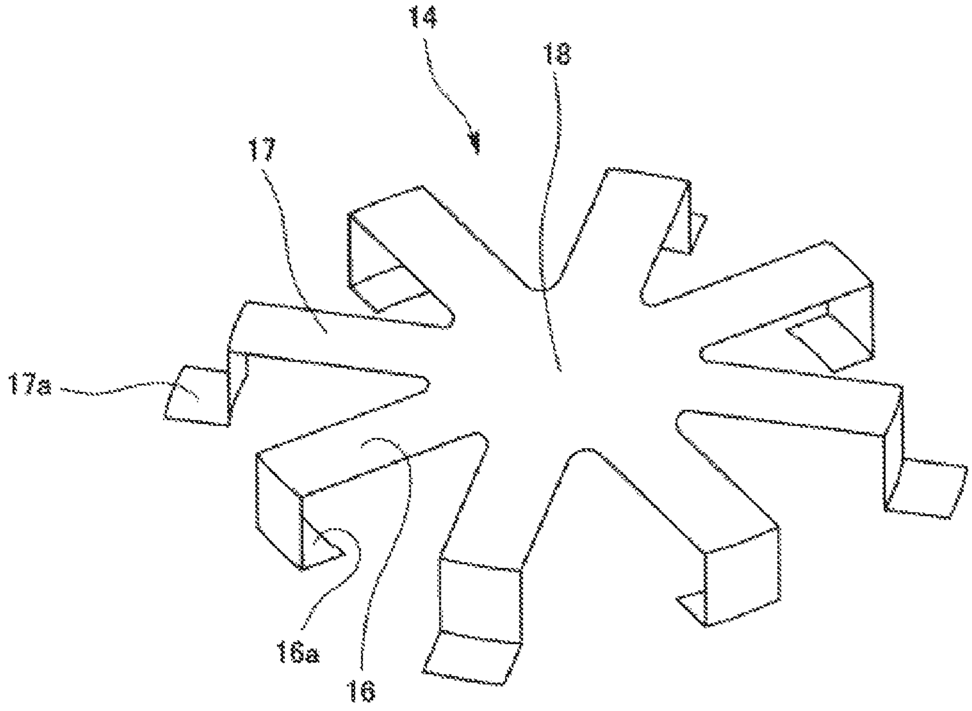
FIG. 6 is a perspective view of a seal retention portion of an accumulator according to a third embodiment of the present invention.
Figure 7:
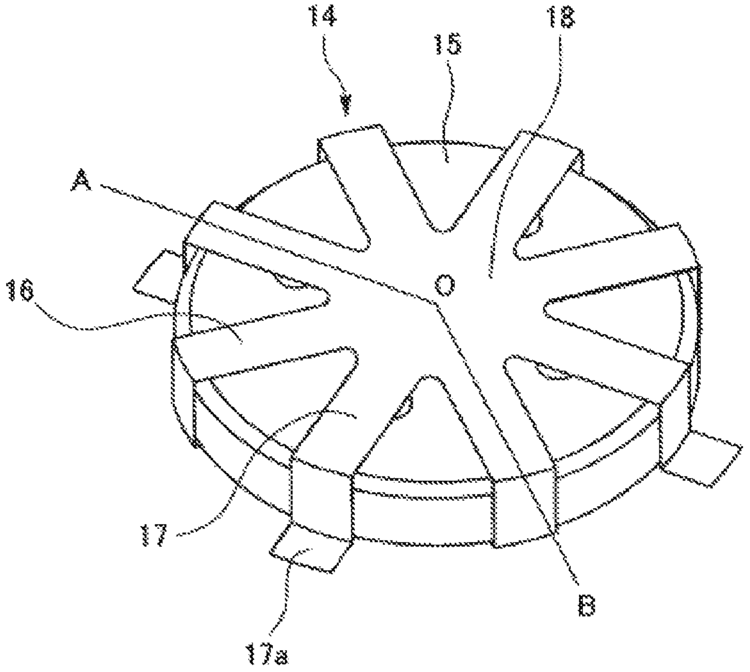
FIG. 7 is a view showing a state in which the seal retention portion of the accumulator according to the third embodiment of the present invention retains a seal.

Next, a description will be given in detail of an accumulator 1 according to a third embodiment of the present invention with reference to FIGS. 6 and 7. FIG. 6 is a perspective view of a seal retention portion 14 of the accumulator 1 according to the third embodiment of the present invention, and FIG. 7 is a view showing a state in which the seal retention portion 14 of the accumulator 1 according to the third embodiment of the present invention retains the seal 15.

More specifically, the seal retention portion 14 according to the present embodiment is formed radially from a base portion 18 which is positioned at the center of the seal retention portion 14, and is constructed by fixed portions 17 which are fixed to the bellows connection portion 12 and are constituted by an elastically deformable leaf spring, and retention portions 16 which are radially formed from the base portion 18 toward a portion between the fixed portion 17 and the adjacent fixed portion 17. Further, since the fixed portion 17 and the retention portion 16 are separated from each other with an appropriate interval, a clearance gap in which the liquid flows is provided between the bellows connection portion 12 and the seal 15.

The base portion 18 is formed at the center of the seal 15 in the gas chamber 9 side or approximately near the center thereof, extends toward a direction of an outer diameter, and comes into contact with the gas chamber 9 side of the seal 15.

The fixed portion 17 extends from an end portion of the base portion 18 toward the direction of the outer diameter, and comes into contact with an outer peripheral surface of the seal 15 by being folded toward the liquid chamber 10 side from the end portion of the seal 15. A leading end portion 17*a* extending toward the direction of the outer diameter is formed in a leading end of the fixed portion 17, and the leading end portion 17*a* is fixed (welded) to the liquid chamber 10 side of the bellows fixing surface 12*c*. Further, the fixed portion 17 is structured such as to be elastically deformable around an end portion of the base portion 18 serving as a supporting point.

The retention portion 16 extends toward the direction of the outer diameter from the end portion of the base portion 18, and comes into contact with the outer peripheral surface of the seal 15 by being folded toward the liquid chamber 10 side from the end portion of the seal 15. A leading end portion 16*a* catching the seal 15 and retaining the seal 15 is formed in a leading end of the retention portion 16 by being folded toward a direction of an inner diameter. As a result, the seal 15 is retained uniformly by the seal retention portion 14.

Figure 8:
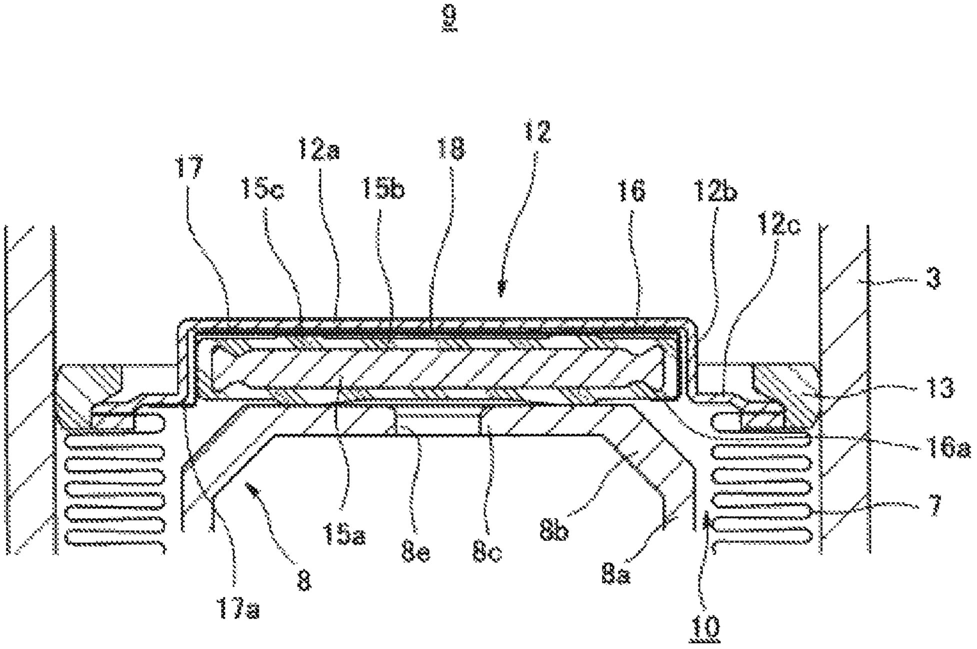
FIG. 8 is an enlarged cross sectional view of a substantial part of a section A-O-B in FIG. 7 and shows a state in which the accumulator according to the third embodiment of the present invention is at the time of zero-down.
Figure 9:
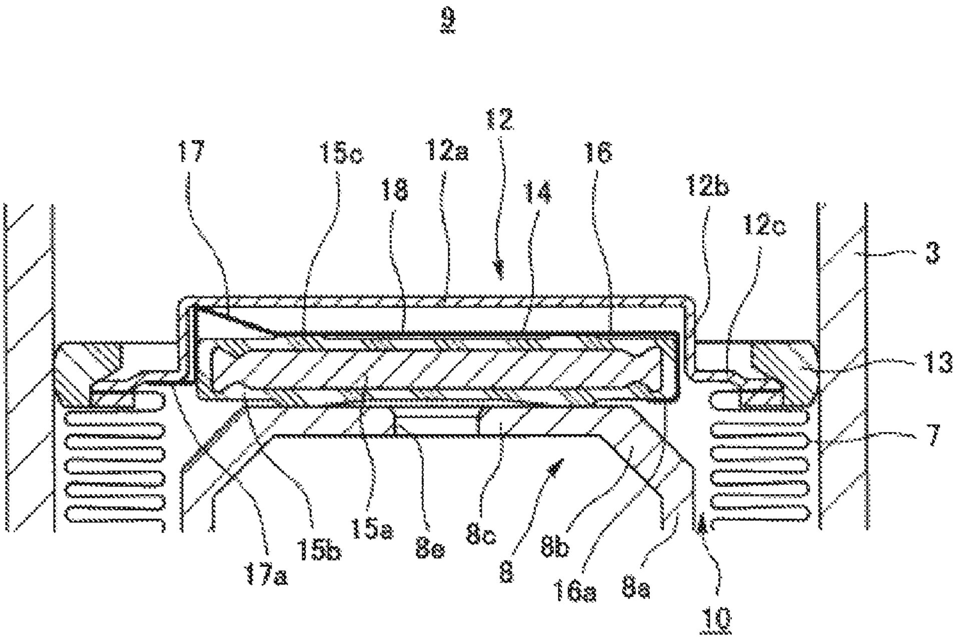
FIG. 9 is an enlarged cross sectional view of the substantial part of the section A-O-B in FIG. 7 and shows a state in which the accumulator according to the third embodiment of the present invention is at the time of operation.

Next, a description will be given of an operation of the accumulator 1. FIG. 8 is an enlarged cross sectional view of a substantial part of a section A-O-B in FIG. 7 and shows a state in which the accumulator 1 according to the third embodiment of the present invention is at the time of zero-down, and FIG. 9 is an enlarged cross sectional view of the substantial part of the section A-O-B in FIG. 7 and shows a state in which the accumulator 1 according to the third embodiment of the present invention is at the time of operation.

At the Time of Steady

The accumulator 1 is connected to a pressure piping of the device in the oil port 4. In the steady time of the pressure piping of the device, the seal 15 moves together with the bellows connection portion 12 while being retained by the seal retention portion 14, and is away from the end face portion 8*c* of the stay 8. As a result, the gas chamber side liquid outlet and inlet 8*e* provided in the end face portion 8*c* is in an open state. Therefore, the gas chamber side liquid outlet and inlet 8*e* is communicated with the liquid chamber side liquid outlet and inlet 4*b* provided in the oil port 4 side, and the liquid having the pressure in correspondence to occasions flows into the liquid chamber 10 from the liquid chamber side liquid outlet and inlet 4*b*. As a result, the bellows connection portion 12 can move as occasion demands together with the seal retention portion 14 and the seal 15 so that the liquid pressure and the gas pressure balance.

At the Time of Zero-Down

In the case that the zero-down state comes from the state of the steady time mentioned above, the liquid within the liquid chamber 10 is discharged out of the liquid chamber side liquid outlet and inlet 4*b* in the oil port 4. Accordingly, the liquid pressure is below the gas pressure. In conjunction with this, the bellows connection portion 12 moves in the contracting direction of the bellows 7, as shown in FIG. 8. Thereafter, the seal 15 arranged in the liquid chamber 10 side of the bellows connection portion 12 seats on the end face portion 8*c* of the stay 8, and closes the gas chamber side liquid outlet and inlet 8*e*. As a result, since a part of the liquid is confined in the liquid chamber 10, the further pressure drop in the liquid chamber 10 is prevented, and the liquid pressure and the gas pressure in the liquid chamber 10 and the gas chamber 9 balance inside and outside the bellows connection portion 12.

When Liquid within the Liquid Chamber 10 is Expanded at the Time of Zero-Down In a state in which the seal 15 at the time of zero-down seats on the end face portion 8*c* of the stay 8 and the liquid chamber 10 is closed, the liquid confined in the liquid chamber 10 and the gaseous matter confined in the gas chamber 9 may be expanded by the rise of the atmospheric temperature. In this case, a pressure difference is generated between the liquid pressure and the gas pressure on the basis of the expansion of the liquid which is great in coefficient of expansion in comparison with the gaseous matter. Since an inner periphery of the flange surface 12*b* has a large diameter in relation to an outer periphery of the seal 15, a clearance gap in which the liquid flows is provided between the inner periphery of the flange surface 12*b* and the seal 15, and a clearance gap in which the liquid flows is provided in the seal portion 14 between the fixed portion 17 and the retention portion 16 which are adjacent to each other in a concentric direction. Therefore, the liquid passes between the inner periphery of the flange surface 12*b* and the seal 15 via the clearance gap which is provided in the seal retention portion 14 and reaches the space which is provided by the spacer 15*c*, on the basis of the rising liquid pressure. As a result, the bellows connection portion 12 moves to a position where the liquid pressure and the gas pressure balance toward the extending direction of the bellows 7 on the basis of the pressure difference, as shown in FIG. 9. Further, the fixed portion 17 fixed to the bellows fixing surface 12*c* in the bellows connection portion 12 elastically deforms around the base portion 18 serving as a supporting point while the seal 15 retained by the retention portion 16 keeps seating on the end face portion 8*c* of the stay 8. Therefore, when the liquid confined in the liquid chamber 10 is thermally expanded at the time of zero-down, only the bellows connection portion 12 moves toward a position where the liquid pressure and the gas pressure balance while the seal 15 keeps seating on the end face portion 8*c*.

Since the liquid pressure acts on the gas chamber 9 side of the seal 15 in its whole area, and the liquid pressure acts only on the surface in which the seal 15 does not seat on the stay 8 in the liquid chamber 10 side of the seal 15, the pressure difference is generated between the liquid chamber 10 side and the gas chamber 9 side. On the other hand, the pressure difference like the seal 15 is not generated in the liquid pressure and the gas pressure which are applied to the bellows connection portion 12. Therefore, the seal 15 does not move in the extending direction of the bellows 7.

According to the accumulator 1 having the structure mentioned above, in the case that the liquid confined in the liquid chamber 10 is thermally expanded at the time of zero-down, only the bellows connection portion 12 moves toward the position where the liquid pressure and the gas pressure balance, while the seal 15 keeps seating on the end face portion 8*c*. Therefore, since the seal retention portion 14 can absorb the pressure difference and can reduce the pressure difference, it is possible to maintain the balancing state of the liquid pressure and the gas pressure, and it is possible to prevent the bellows 7 from being broken in the accumulator 1. As a result, it is possible to improve the durability of the accumulator 1 including the bellows 7.

Further, the seal retention portion 14 plays both of a role of retaining the seal 15 and a role of allowing a relative displacement of the seal 15 and the bellows connection portion 12. Accordingly, it is possible to reduce the number of parts of the pressure fluctuation absorbing mechanism, it is possible to easily assemble, and it is possible to reduce a parts cost.

Further, since the seal retention portion 14 is provided in the radial direction of the partition portion 11, the seal retention portion 14 does not interfere with the stay 8. As a result, the end face portion 8*c* can be integrally formed toward the direction of the inner diameter directly from one end of the cylindrical portion 8*a* in the gas chamber 9 side without any special shape applied to the stay 8. Therefore, it is possible to reduce a parts cost of the stay 8.

Further, since the seal retention portion 14 is arranged between the seal contact surface 12*a* and the seal 15, the clearance gap is formed between the seal 15 and the bellows connection portion 12. Therefore, the seal retention portion 14 also plays a role of the spacer 15*c*, any special shape is not necessarily applied to the gas chamber 9 side of the seal 15.

Figure 10:
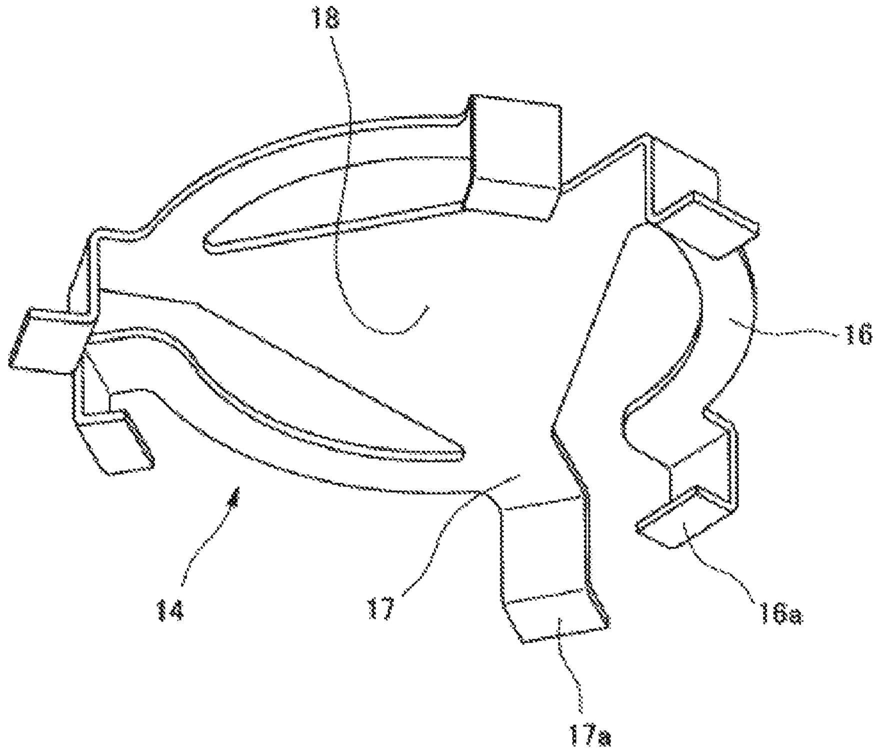
FIG. 10 is a perspective view of a seal retention portion of an accumulator according to a fourth embodiment of the present invention.
Figure 11:
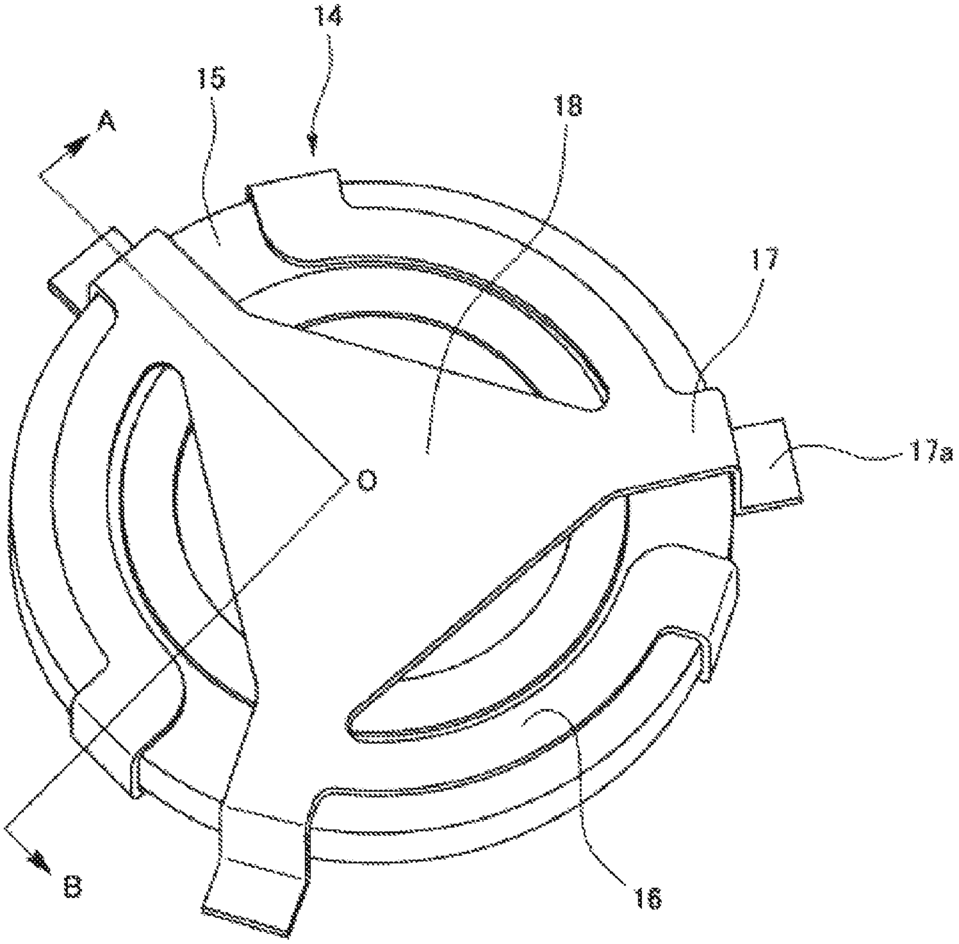
FIG. 11 is a view showing a state in which the seal retention portion of the accumulator according to the fourth embodiment of the present invention retains a seal.

Next, a description will be given in detail of an accumulator 1 according to a fourth embodiment of the present invention with reference to FIGS. 10 and 11. FIG. 10 is a perspective view of a seal retention portion 14 of the accumulator 1 according to the fourth embodiment of the present invention, and FIG. 11 is a view showing a state in which the seal retention portion 14 of the accumulator 1 according to the fourth embodiment of the present invention retains the seal 15.

More specifically, the seal retention portion 14 is provided with a base portion 18 which is formed into an approximately triangular shape in its plane, fixed portions 17 which are extended toward a direction of an outer diameter from an end portion of the base portion 18 and are fixed to the bellows connection portion 12, and retention portions 16 which are formed from one side in a circumferential direction from the midstream in a length direction of the fixed portions 17 in a radial direction, and are constructed by a leaf spring which retains the seal 15 and is elastically deformable.

The base portion 18 is structured such as to extend toward a direction of an outer diameter from the center of the seal 15 in the gas chamber 9 side or the base portion 18 which is positioned approximately at the center, and come into contact with the gas chamber 9 side of the seal 15.

The fixed portion 17 extends from an end portion of the base portion 18 toward the direction of the outer diameter, and comes into contact with an outer peripheral surface of the seal 15 by being folded toward the liquid chamber 10 side from the end portion of the seal 15. A leading end portion 17*a* extending toward the direction of the outer diameter is formed in a leading end of the fixed portion 17, and the leading end portion 17*a* is fixed to the liquid chamber 10 side of the bellows fixing surface 12*c*.

The retention portion 16 is formed toward one side in the circumferential direction from the midstream in the length direction of the fixed portion 17 in the radial direction, and a leading end portion 16*a* catching the seal 15 and retaining the seal 15 is formed in a leading end of the retention portion 16 by being folded toward a direction of an inner diameter. As a result, the seal 15 is retained uniformly by the seal retention portion 14. Further, the retention portion 16 is elastically deformable around the midstream of the fixed portion 17 in the length direction serving as a supporting point.

Figure 12:
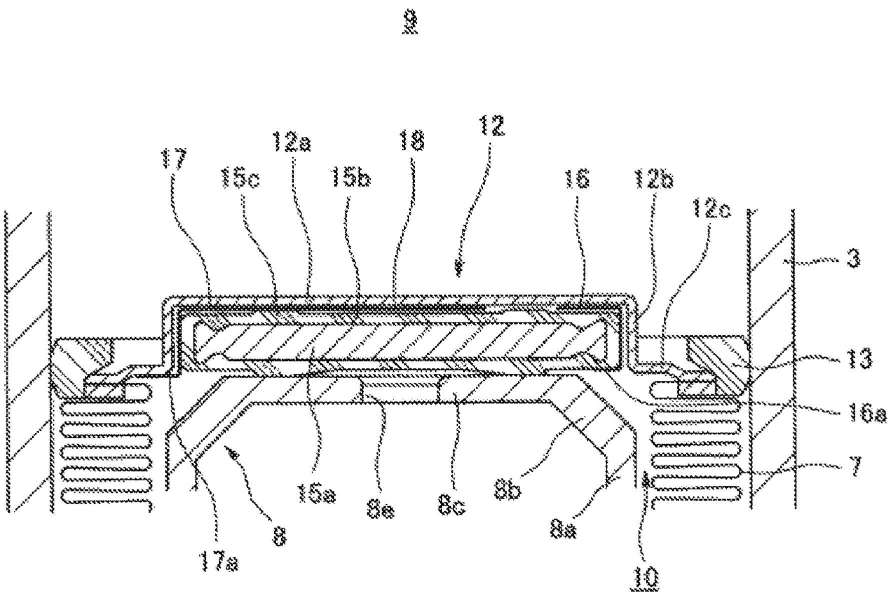
FIG. 12 is an enlarged cross sectional view of a substantial part of a section A-O-B in FIG. 11 and shows a state in which the accumulator according to the fourth embodiment of the present invention is at the time of zero-down.
Figure 13:
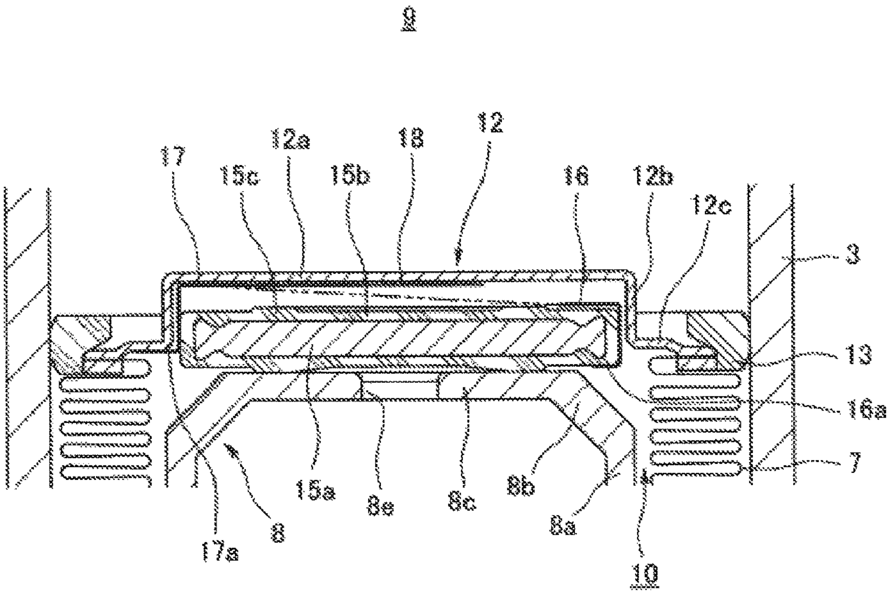
FIG. 13 is an enlarged cross sectional view of the substantial part of the section A-O-B in FIG. 11 and shows a state in which the accumulator according to the fourth embodiment of the present invention is at the time of operation.

Next, a description will be given of an operation of the accumulator 1. FIG. 12 is an enlarged cross sectional view of a substantial part of a section A-O-B in FIG. 11 and shows a state in which the accumulator 1 according to the fourth embodiment of the present invention is at the time of zero-down, and FIG. 13 is an enlarged cross sectional view of the substantial part of the section A-O-B in FIG. 11 and shows a state in which the accumulator 1 according to the fourth embodiment of the present invention is at the time of operation. The operations of the steady time and the zero-down time in the accumulator 1 according to the present embodiment are the same as the accumulator 1 according to the third embodiment mentioned above.

When Liquid within Liquid Chamber 10 is Expanded at the Time of Zero-Down

In a state in which the seal 15 at the time of zero-down seats on the end face portion 8*c* of the stay 8 and the liquid chamber 10 is closed, the liquid confined in the liquid chamber 10 and the gaseous matter confined in the gas chamber 9 may be expanded by the rise of the atmospheric temperature. In this case, a pressure difference is generated between the liquid pressure and the gas pressure on the basis of the expansion of the liquid which is great in coefficient of expansion in comparison with the gaseous matter. Since an inner periphery of the flange surface 12*b* has a large diameter in relation to an outer periphery of the seal 15, a clearance gap in which the liquid flows is provided between the inner periphery of the flange surface 12*b* and the seal 15, and a clearance gap in which the liquid flows is provided in the seal portion 14 between the fixed portion 17 and the retention portion 16 which are adjacent to each other in a concentric direction. Therefore, the liquid passes between the inner periphery of the flange surface 12*b* and the seal 15 via the clearance gap which is provided in the seal retention portion 14 and reaches the space which is provided by the spacer 15*c*, on the basis of the rising liquid pressure. As a result, the bellows connection portion 12 moves to a position where the liquid pressure and the gas pressure balance toward the extending direction of the bellows 7 on the basis of the pressure difference, as shown in FIG. 13. Further, in the case that the bellows connection portion 12 moves to a position where the liquid pressure and the gas pressure balance toward the extending direction of the bellows 7 while the seal 15 retained by the retention portion 16 keeps seating on the end face portion 8*c* of the stay 8, the fixed portion 17 fixed to the bellows fixing surface 12*c* moves to the position where the liquid pressure and the gas pressure balance toward the extending direction of the bellows 7 together with the bellows connection portion 12, and the retention portion 16 elastically deforms so as to twist around the midstream in the length direction of the fixed portion 17 in the radial direction serving as a supporting point. Therefore, when the liquid confined in the liquid chamber 10 is thermally expanded at the time of zero-down, only the bellows connection portion 12 moves toward a position where the liquid pressure and the gas pressure balance while the seal 15 keeps seating on the end face portion 8*c*.

Since the pressure acts on the gas chamber 9 side of the seal 15 in its whole area, and the liquid pressure acts only on the surface in which the seal 15 does not seat on the stay 8 in the liquid chamber 10 side of the seal 15, the pressure difference is generated between the liquid chamber 10 side and the gas chamber 9 side. On the other hand, the pressure difference like the seal 15 is not generated in the liquid pressure and the gas pressure which are applied to the bellows connection portion 12. Therefore, the seal 15 does not move in the extending direction of the bellows 7.

According to the accumulator 1 having the structure mentioned above, the seal retention portion 14 can secure the more length of the retention portion 16 in comparison with the seal retention portion 14 according to the third embodiment, in addition to the operations and effects of the accumulator 1 according to the third embodiment mentioned above. Therefore, at the time of zero-down, the driven allowable width of the seal retention portion 14 can be secured more when the liquid within the liquid chamber 10 expands, and the bellows connection portion 12 moves to the position where the liquid pressure and the gas pressure balance toward the extending direction of the bellows 7.

Figure 14A:
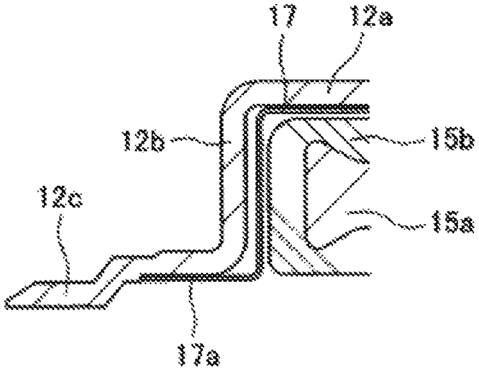
Figure 14B:
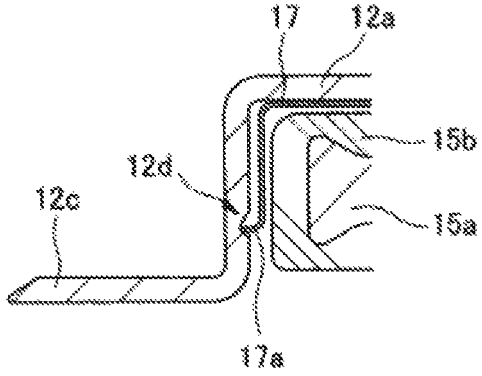
Figure 14C:
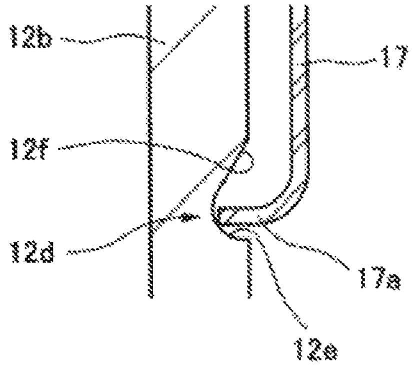
Figure 15:
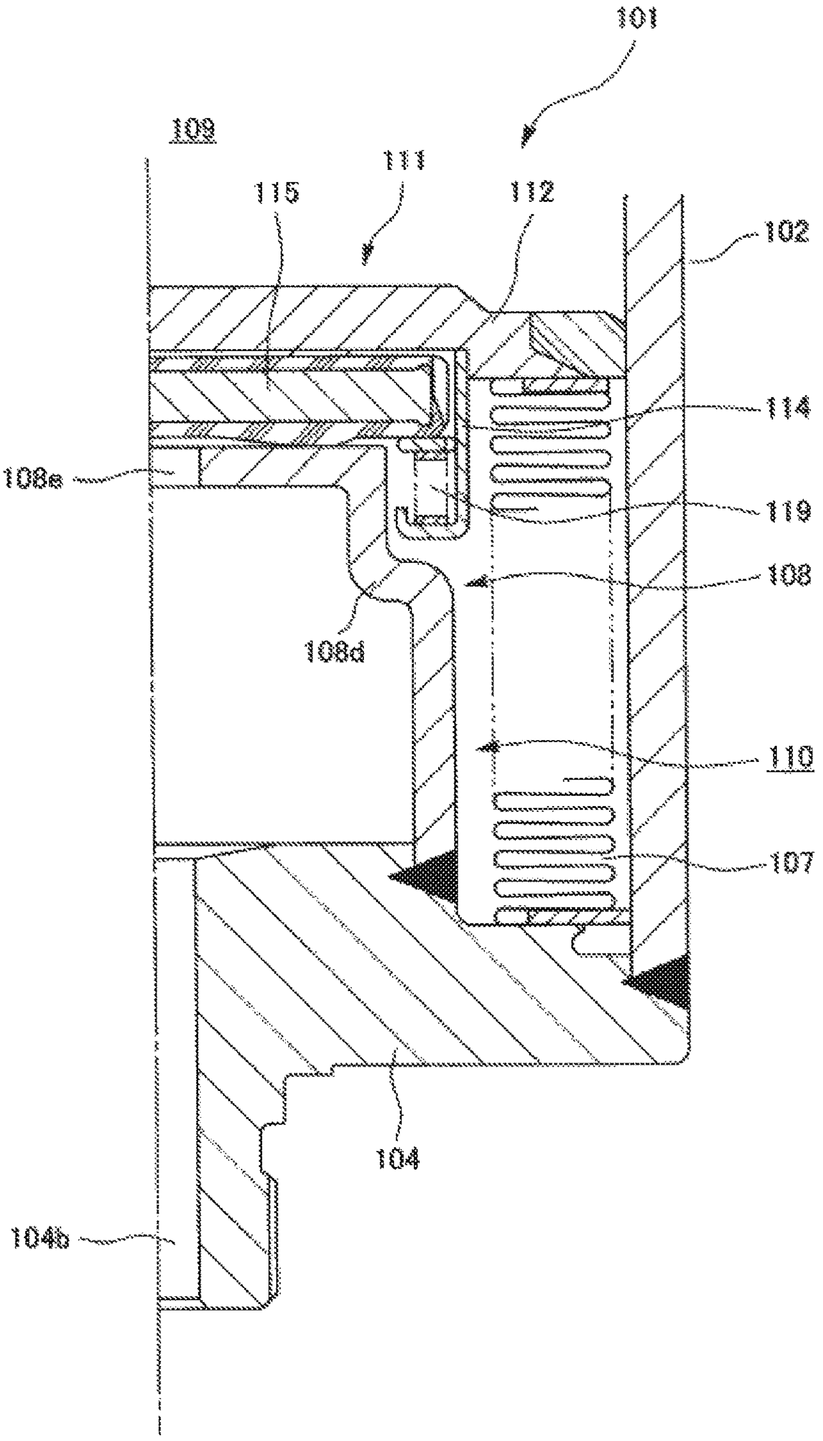
FIG. 15 is an enlarged cross sectional view of a substantial part and shows a state in which an accumulator according to the conventional example is at the time of zero-down.
Figure 16:
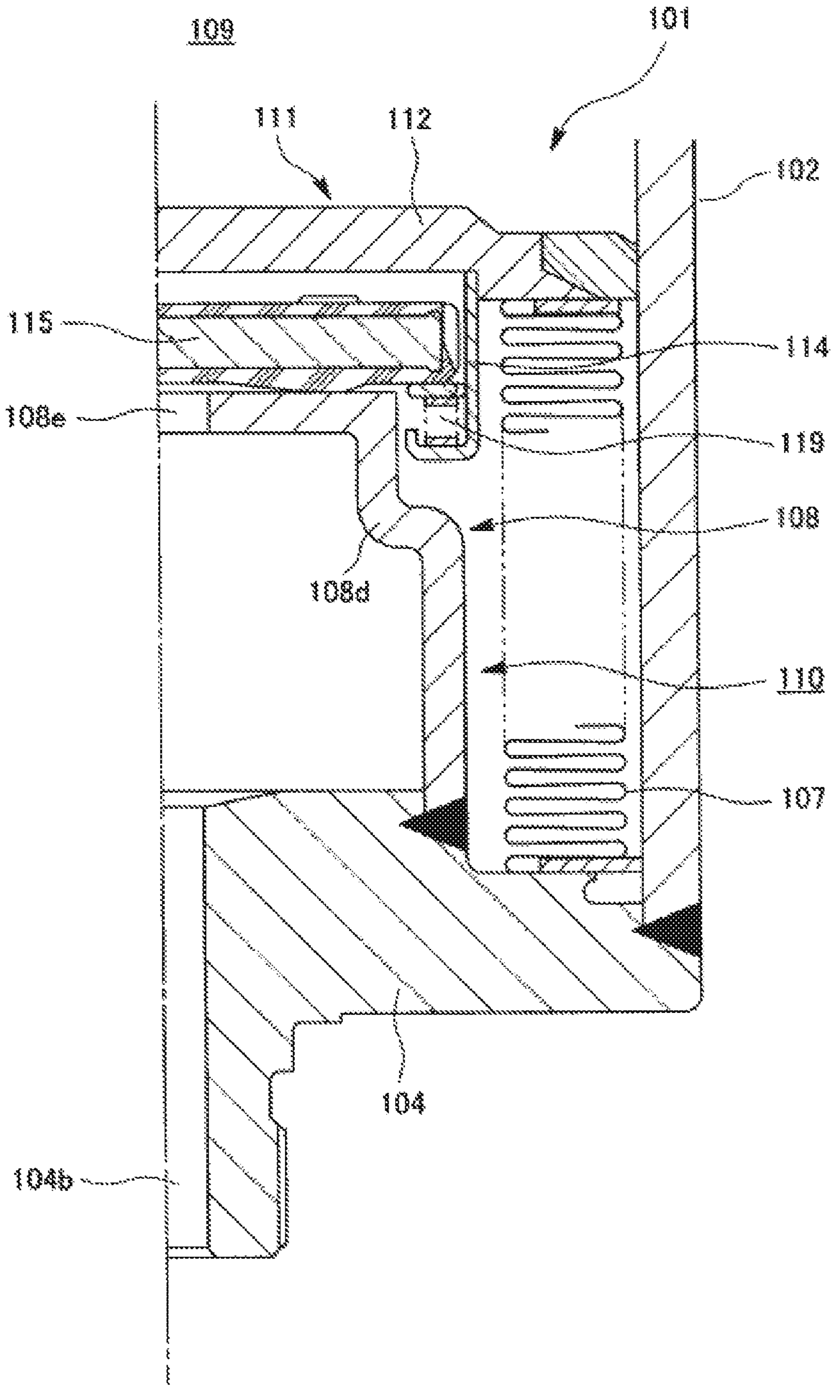
FIG. 16 is an enlarged cross sectional view of a substantial part and shows a state in which the accumulator according to the conventional example is at the time of operation.

Next, a description will be given in detail of an accumulator 1 according to a fifth embodiment of the present invention with reference to FIGS. 14A, 14B and 14C. FIGS. 14A, 14B and 14C are enlarged cross sectional views of a substantial part of the accumulator 1 according to the present invention, in which FIG. 14A is the enlarged cross sectional view of the substantial part of a partition portion 11 in the accumulators 1 according to the third and fourth embodiments, FIG. 14B is the enlarged cross sectional view of a substantial part of a partition portion 11 in the accumulator 1 according to the fifth embodiment, and FIG. 14C is the enlarged cross sectional view of a substantial part of a fixing groove 12*d* in FIG. 14B.

More specifically, in the accumulator 1 according to the present embodiment, a leading end portion 17*a* of the fixed portion 17 in the seal retention portion 14 is locked to the fixing groove 12*d* which is formed in the bellows connection portion 12.

The bellows connection portion 12 according to the present embodiment is formed into an approximately concave shape in its cross section, and is constructed by a seal contact surface 12*a* which comes into contact with the seal 15 and a spacer 15*c* which is provided in the seal 15 in the liquid chamber 10 side, annular flange surfaces 12*b* which are formed toward the liquid chamber 10 side from both ends of the seal contact surface 12*a*, and a bellows fixing surface 12*c* which is extended in a direction of an outer diameter from one end of the flange surface 12*b* in the liquid chamber 10 side. Here, an inner periphery of the flange surface 12*b* has a large diameter in relation to the outer periphery of the seal 15. Further, the fixing groove 12*d* for locking the leading end portion 17*a* of the fixed portion 17 is formed on an inner surface of the flange surface 12*b* along a circumferential direction.

The fixing groove 12*d* is formed by notching a part of the flange surface 12*b*, and a liquid chamber side inclined surface 12*e* and a gas chamber side inclined surface 12*f* are formed on the boundary of the leading end portion 17*a* of the fixed portion 17 which is locked to the fixing groove 12*d*.

The liquid chamber side inclined surface 12*e* and the gas chamber side inclined surface 12*f* are inclined toward the direction of the outer diameter from the inner surface of the flange surface 12*b*, and an angle of incidence of the liquid chamber side inclined surface 12*e* in relation to the inner surface of the flange surface 12*b* is set to be larger than an angle of incidence of the gas chamber side inclined surface 12*f* in relation to the inner surface of the flange surface 12*b*. Further, the leading end portion 17*a* of the fixed portion 17 is locked to an intersecting point of the liquid chamber side inclined surface 12*e* and the gas chamber side inclined surface 12*f*.

Further, the fixed portion 17 in the seal retention portion 14 according to the present embodiment is folded toward the direction of the outer diameter in the midstream of the flange surface 12*b* in the length direction, and the leading end portion 17*a* is formed in the leading end of the folded fixed portion 17.

Further, the bellows connection portion 12 and the seal retention portion 14 are fixed by arranging the seal retention portion 14 retaining the seal 15 in the inner surface of the bellows connection portion 12, and locking the leading end portion 17*a* of the fixed portion 17 to the inner surface of the flange surface 12*b*.

On the basis of the accumulator 1 according to the present embodiment, the shape of the bellows fixing surface 12*c* can be formed simple since it is not necessary to fix (deposit) the leading end portion 17*a* of the fixed portion 17 to the bellows fixing surface 12*c*, in comparison with the accumulators 1 according to the third and fourth embodiments shown in FIG. 14A.

Further, on the basis of the accumulator 1 according to the present embodiment, since the fixing groove 12*d* can be formed only by the provision of the notch on the inner surface of the flange surface 12*b*, it is possible to easily fix the leading end portion 17*a* of the fixed portion 17 in comparison with the accumulators 1 according to the third and fourth embodiments.

What is claimed is:

1. An accumulator comprising:
- a pressure vessel;
- a partition that divides an internal space of the pressure vessel into a gas chamber in which gaseous matter is sealed and a liquid chamber to which liquid is introduced;
- a bellows connected to a bellows connection surface of the partition;
- a seal which is arranged on a liquid chamber side of the partition, the seal having a first major surface that faces the gas chamber, an opposite second major surface that faces the liquid chamber, and a side surface that connects the first major surface and the second major surface; and
- a seal retention member that is fixed to the bellows connection surface of the partition and retains the seal;
- wherein the seal retention member includes:
  - a base that overlaps the first major surface of the seal and includes a center that is aligned with a center of the seal,
  - a plurality of first arms that extend radially outward from the center and define a terminal end that is fixed to the bellows connection surface of the partition, and
  - a plurality of second arms that each define a free end that is constructed as an elastically deformable leaf spring that is engaged with the second major surface of the seal to retain the seal between the leading end and the base.

2. The accumulator according to claim 1, wherein a fixing groove is formed in an inner peripheral surface of the bellows connection surface, and the terminal ends of the first arms are locked to the fixing groove.

3. The accumulator according to claim 1, wherein each of the second arms extend radially outward from the center of the base.

4. The accumulator according to claim 3, wherein each of the second arms includes a first section that extends along the first major surface of the seal, a second section orthogonally connected to the first section that extends along the side surface of the seal, and a third section connected to the second section that extends radially inward back toward the center of the base from the second section to overlap the second major surface of the seal and define the free end.

5. The accumulator according to claim 1, wherein each of the second arms extend outward from the first arms.

6. The accumulator according to claim 5, wherein each of the second arms include a first section attached to the first arm, and the first section attached to the first arm extends circumferentially about a perimeter of the seal.

7. The accumulator according to claim 6, wherein each of the second arms includes a second section orthogonally connected to the first section that extends along the side surface of the seal, and a third section connected to the second section that extends radially inward back toward the center of the base from the second section to overlap the second major surface of the seal and define the free end.

* * * * *